United States Patent [19]
Barkan

[11] Patent Number: 5,126,545
[45] Date of Patent: Jun. 30, 1992

[54] PORTABLE LASER SCANNING SYSTEM HAVING A MOTOR DRIVE WITH NO DC WINDINGS

[75] Inventor: Edward Barkan, South Setauket, N.Y.

[73] Assignee: Symbol Technologies, Inc., Bohemia, N.Y.

[21] Appl. No.: 465,980

[22] Filed: Jan. 16, 1990

[51] Int. Cl.$^5$ .................. G06K 7/10; H02K 33/00; H02P 1/00; H02P 3/00
[52] U.S. Cl. ..................... 235/467; 235/470; 235/472; 318/129
[58] Field of Search ............ 235/467, 470, 462, 472; 350/6.6; 318/129

[56] References Cited

U.S. PATENT DOCUMENTS

| | | | |
|---|---|---|---|
| 3,400,316 | 9/1968 | Kuschel | 318/129 |
| 3,917,394 | 11/1975 | Sturdevant | 350/255 |
| 4,007,377 | 2/1977 | Simon et al. | 235/467 |
| 4,187,452 | 2/1980 | Knappe et al. | 350/6.6 |
| 4,251,798 | 2/1981 | Swartz et al. | 350/6.6 |
| 4,387,297 | 6/1983 | Swartz et al. | 235/462 |
| 4,495,450 | 1/1985 | Tokizaki et al. | 318/254 |
| 4,496,831 | 1/1985 | Swartz et al. | 235/472 |
| 4,593,186 | 6/1986 | Swartz et al. | 235/472 |
| 4,618,806 | 10/1986 | Grouse | 318/254 |
| 4,652,806 | 3/1987 | Aiello | 318/685 |
| 4,992,717 | 2/1991 | Marwin et al. | 235/467 |

Primary Examiner—Stuart S. Levy
Assistant Examiner—Christopher R. Glembocki
Attorney, Agent, or Firm—Scully, Scott, Murphy & Presser

[57] ABSTRACT

A lightweight hand-held scanning device for repetitively scanning a laser light source having a laser light generating means and at least one high speed scanning motor controlled by a motor drive circuit which adjusts the amplitude and presets the frequency of oscillation of a high speed scanning motor. The frequency and amplitude regulation is accomplished by using an open loop control system that supplies two opposing stator windings of the scanning motor with a pair of periodic triangular current waveforms that are 180 degrees out of phase for energizing an de-energizing the stator coils respectively. The energizing and de-energizing of the opposing stator coils causes variations in the magnetic strength of these coils, thereby causing the rotor to alternately align itself with the energizing stator coil which results in a smooth oscillating motion of the motor shaft. By adjusting the amplitude, and presetting the frequency of oscillation of the high speed scanning motor, the motor can maintain a consistent scanning speed and use less power.

16 Claims, 5 Drawing Sheets

PORTABLE LASER SCANNING SYSTEM HAVING A MOTOR DRIVE WITH NO DC WINDINGS

REFERENCE TO RELATED CASES

This application is related to U.S. Pat. No. 5,019,764, U.S. Pat. No. 4,992,717 and U.S. Pat. No. 5,003,164, said patents being assigned to Symbol Technologies, Inc.

BACKGROUND OF THE INVENTION

1. Field of the Invention

The present invention relates to laser scanning systems for reading bar code symbols, and more particularly, to motor control circuits for hand held portable laser scanning heads.

2. Description of the Prior Art

The increased use of bar code symbols to identify products, particularly in retail business, has resulted in the development of various bar code reading systems. Many users of bar code readers require portable hand held scanners which place a premium of size, weight and power requirements for the devices. One such system is a laser scanning bar code reading system as described in U.S. Pat. No. 4,496,831, assigned to the same assignee as the present invention and incorporated by reference herein.

The laser scanning system disclosed in U.S. Pat. No., 4,496,831 includes a portable hand held scanning head which may be embodied in various shapes but preferably has a gunshaped housing made of lightweight but flexible plastic. A handle and barrel portion are provided to house the various components of the scanning head therein. Within the barrel portion are mounted a miniature light source, a miniature optic train including focusing lenses for directing the light source, miniature scanning means for sweeping the light source across a bar code symbol, and miniature sensing means for detecting reflected light from the bar code symbol being scanned. The handle portion generally supports a DC power supply.

The miniature light source comprises a laser tube such as a co-axial helium-neon laser tube, or preferably, a semiconductor laser diode, which is considerably smaller and lighter than a laser tube, thus reducing the required size and weight of the scanning head, and making the scanning head easier to handle and more maneuverable. Light generated by the light source passes through the optic train which focuses the beam to impinge upon the scanning means, which are mounted in the light path within the barrel portion of the scanning head. The scanning means sweeps the laser beam across the bar code symbol, and comprises at least one scanning motor for sweeping the beam lengthwise across the symbol, and preferably comprises two motors, where the second motor sweeps the beam widthwise across the symbol. Light reflecting means such as mirrors are mounted on the motor shafts to direct the beam through the outlet port to the symbol. The sensing means then detects and processes the light reflected off the symbol, and generally comprises photosensitive elements such as semiconductor photodiodes.

The structural aspects of the scanning motor are analogous to a stepper motor which is a device used to convert electrical pulses into discrete mechanical angular movements every time the polarity of a stator winding in changed. When this structure is used as a scanning motor, a scanning motor control means is employed to oscillate the shaft first in one circumferential direction over an arc length less than 360°, and secondly in the opposite circumferential direction over an arc length less than 360°, and thereafter to repeat the aforementioned cycle at a high rate of speed.

The motor control means for the above prior art scanning head includes a reference means for applying a generally constant low level direct current voltage to one of the stator windings, thereby energizing one set of stator poles as north and south. The motor control means also includes a variable means for applying a periodic voltage of time-varying amplitude to the second set of stator windings, thereby energizing the second set of stator poles as north and south. By varying the polarity and frequency of the periodic voltage, the rotor will align itself accordingly. The high speed scanning motor is controlled in such a way as to cause the motor shaft to move in an analog manner to an angular position which corresponds to the amplitude of an applied periodic voltage, with the number of degrees of angular movement being proportional to the periodic voltage amplitude. The speed of movement of the shaft corresponds to the rate of change of the periodic voltage, and the direction of movement is dependent upon the slope of the periodic voltage, whose waveform may be any time-varying voltage, such as a sine wave, triangular wave, sawtooth wave, or the like. Moreover, it is recognized that by adjusting the voltage applied to the direct current stator windings to the resonant frequency of the motor, the frequency of movement will be at or near resonance resulting in a reduction of the required power. However, in the control circuit of the above referenced patent, two power supplies are required, one of which continuously supplies a constant low level direct current voltage to one of the stator windings.

In another aspect of the above referenced patent, a closed loop control circuit is disclosed to provide linear tracking of the laser scanning beam. The control circuit comprises a primary coil, two or more secondary coils and a moveable shield. The shield is fixedly mounted on the motor shaft for joint oscillatory movement therewith, and is located between the primary coil and two secondary coils. Tuning capacitors are used to tune the secondary coils to resonate at the frequency at which the primary coil is excited, the secondary coils are inductively coupled to it to establish an oscillating magnetic field, and an AC voltage of the same high oscillating frequency as the primary coil appears across the secondary coils, and is detected by sensing circuitry. The sensing circuitry detects the voltage on its respectively associated secondary coil, and feeds the voltages to a differential amplifier for generating a difference signal which is proportional to the angular displacement of the shaft. This difference signal is, in turn, fed to one input of another differential amplifier whose input is supplied with a control voltage. The output of the amplifier is then fed to the stator coil. The aforementioned patent, therefore, sets forth an elaborate system to control the amplitude of oscillation of the motor shaft. Although the control circuit of the above referenced patent provides a means for monitoring and adjusting the amplitude of oscillation of the motor shaft, the present invention allows the amplitude to be adjusted or set initially and does not require continuous monitoring or regulation.

SUMMARY OF THE INVENTION

The present invention is an improvement for a hand held laser scanning system used to scan bar code symbols having a novel motor drive circuit for the scanning motor. The motor drive circuit of the present invention determines the amplitude of oscillation of the high speed scanning motor and to a lesser extent, the frequency of oscillation. The scanning motor includes a pair of stator coil windings respectively mounted in upper and lower stator housings. A permanent magnet rotor is surrounded by the stator coils and is operatively connected to the output shaft of motor for joint oscillatory movement therewith.

The motor drive circuit of the present invention regulates the amplitude of oscillation of the scanning motor so that a consistent scanning speed can be obtained regardless of individual scanning motor variations. One of the stator windings of the scanning motor is supplied with a periodic current waveform, such as a triangular wave, of predetermined frequency and amplitude. The second stator windings of the scanning motor is supplied with a triangular waveform of equal amplitude and frequency but of opposite polarity. The interaction between these two equal but opposite polarity waveforms provides for smooth rotation of the motor shaft. The amplitude of these current waveforms supplied to both of the stator windings cause the permanent magnet rotor of the motor to oscillate with an amplitude proportional to the amplitude of the supplied waveforms. By adjusting the amplitude of the waveforms, the amplitude of oscillation of the motor shaft can be set at any pre-determined level. The frequency of motor shaft oscillation is also proportional to the frequency of the supplied triangular waveforms and can also be adjusted, or set to a lesser extent, to control the frequency of motor shaft oscillation.

The hand-held scanning head employing the novel motor drive circuit of the present invention overcomes the limitations of the prior art by providing for the pre-set determination of amplitude and frequency for a high speed scanning motor to facilitate accurate and fast scanning of a bar code symbol. By adjustment of the amplitude of oscillation to a pre-determined level, a consistent scanning speed can be obtained thereby increasing the efficiency of the motor. In addition, since frequency regulation is also possible to some extent, the frequency of the periodic triangular waveform can be set at or near the resonant frequency of the motor thereby reducing the driving power required by the motor.

Electrical elements employed in any electrical circuit require a certain amount of space or area, and the amount of space or area required is determined first by the physical size of the element, and secondly by the amount of heat and other forms of energy dissipated by the particular electrical circuit. In the design of a hand-held device, space or area becomes a critical design consideration. In the present circuit both regulation functions are accomplished via an open loop control system; thus, feedback sensing elements which may be expensive, require additional space and consume more power are not necessary. Accordingly, the present invention provides a scanning head for a bar code symbol scanning system having a new practical means to regulate the high speed scanning motor of such a portable laser scanning system where small space, low weight and low power consumption are design criteria. The motor drive circuit of the invention may also be useful in controlling high speed motors in a variety of other applications, such as for example, auto-focusing systems of high speed cameras and the automatic scan or seek function in audio and video system.

BRIEF DESCRIPTION OF THE DRAWING

The foregoing features of this invention will become more readily apparent and may be understood by referring to the following detailed description of a preferred embodiment of the motor drive circuit, taken in conjunction with the accompanying drawings, in which.

DETAILED DESCRIPTION OF THE PREFERRED EMBODIMENT

The motor drive circuit of the present invention adjusts the amplitude and frequency of oscillation of a high speed scanning motor, and accomplishes this regulation by the open-loop control of the current into the two sets of stator windings or coils of the high speed scanning motor. A voltage regulator supplies a constant voltage to a comparator circuit, whose various parameters or gains are selected in order to achieve a certain level of hysteresis thereby causing the comparator circuit to behave as a bistable comparator circuit. The output of this bistable comparator circuit is a square wave whose amplitude is centered around the voltage supplied buy the voltage regulator circuit. This square wave is then fed into an integrator circuit whose gain and time constant are chosen in order to convert the square wave into a triangular waveform with a predetermined amplitude, frequency and slope. The triangular waveform is then fed into a variable gain attenuator in order to adjust the amplitude of the waveform. Although the amplitude of waveforms can be adjusted through the variable gain attenuator, the frequency of oscillation is determined and set by the components of the signal generation means.

Once the amplitude of oscillation is fixed, the triangular waveform is then passed into an inverting voltage-to-current converter and a non-inverting voltage-to-current converter. These converters convert the time-varying voltage waveforms to time-varying current waveforms for reasons that will be explained in subsequent paragraphs. Since one waveform goes through an inverting amplifier and the other goes through a non-inverting amplifier, the waveforms will be 180 degrees out of phase; in other words, when one waveform rises, the other falls. Both converters are connected to individual bipolar junction transistors which act as current switches. Based on the voltage of the input waveform entering the voltage-to-current converters, the transistors either draw more or less current from the power supply through the motor coils thereby increasing or decreasing the magnetic force field of each set of stator coils. As one waveform causes more current to be drawn from its particular stator coil, the other waveform causes less current to be drawn from the second stator coil. The amplitude and frequency of current drawn through the stator coils causes the stator coils to develop periodic, time-varying magnetic fields with a magnetic strength proportional to amplitude of the incoming current waveform, which causes the rotor of the motor to oscillate proportionally to the amplitude of the incoming current waveform. This is easily seen from the fact that as one set of stator poles becomes dominant over the other set, the permanent magnet rotor will tend to align itself with that dominant set of stator poles. The stronger the set of stator poles, the further the rotor will turn to align itself. In addition, the frequency of oscillation of the motor shaft is proportional to the frequency at which the current through the stator coils changes; therefore, once the frequency of the waveforms is set, the frequency of oscillation of the motor shaft is also set.

Figure 1:
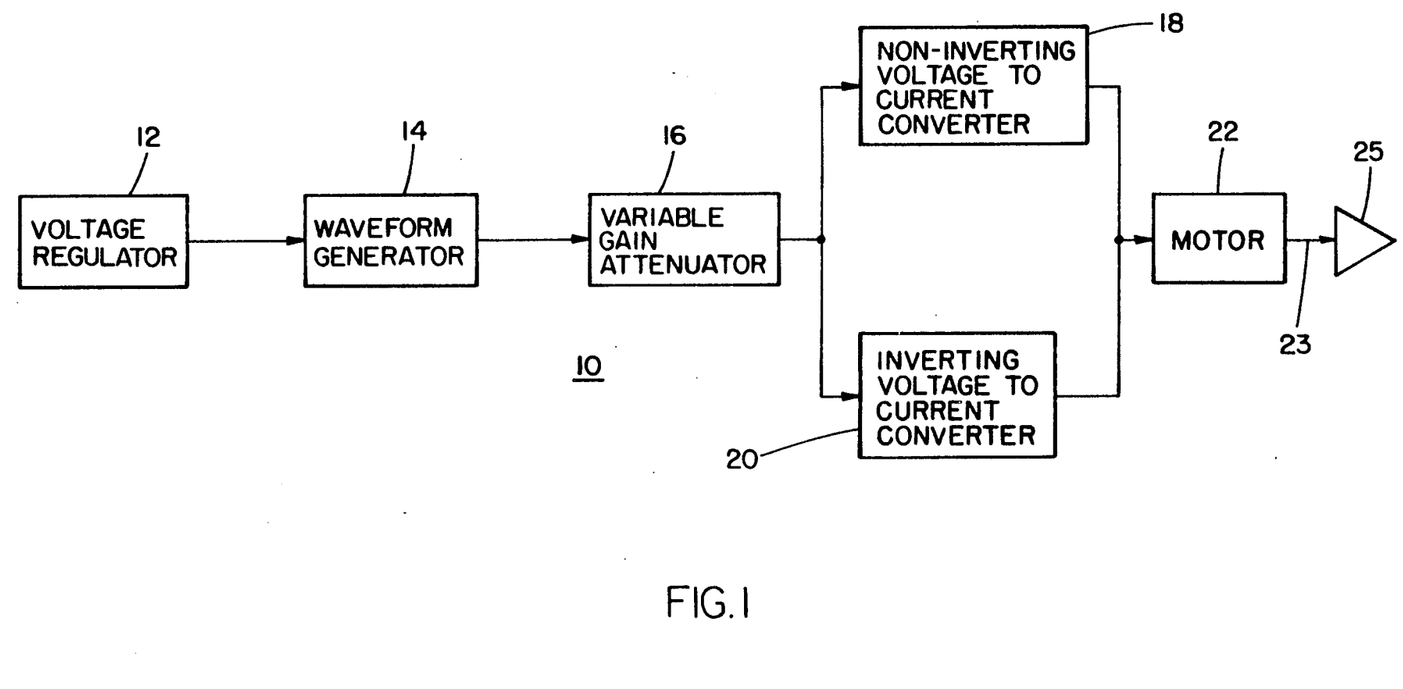
FIG. 1 illustrates a block diagram of the motor drive circuit of the present invention.

Referring now to FIG. 1, there is shown a block diagram illustrating the motor drive circuit 10. The circuit is comprised of a voltage regulator circuit 12, a waveform generator circuit 14, a variable gain attenuator circuit 16, a non-inverting voltage-to-current converter circuit 18, an inverting voltage-to-current converter circuit 20, and a high speed scanning motor 22, with motor shaft 23 and light reflecting means 25.

The voltage regulator circuit 12 provides a constant dc voltage signal to the signal generator circuit 14. The constant dc voltage signal is used by the signal generator circuit 14 to generate a triangular waveform signal which will ultimately be used to regulate the amplitude of motor shaft oscillation. In order to ensure uniform motor shaft oscillation the generated waveform signal must be of consistant amplitude and frequency; therefore, the dc voltage supplied by the voltage regulator circuit 12 must not vary.

Figure 2:
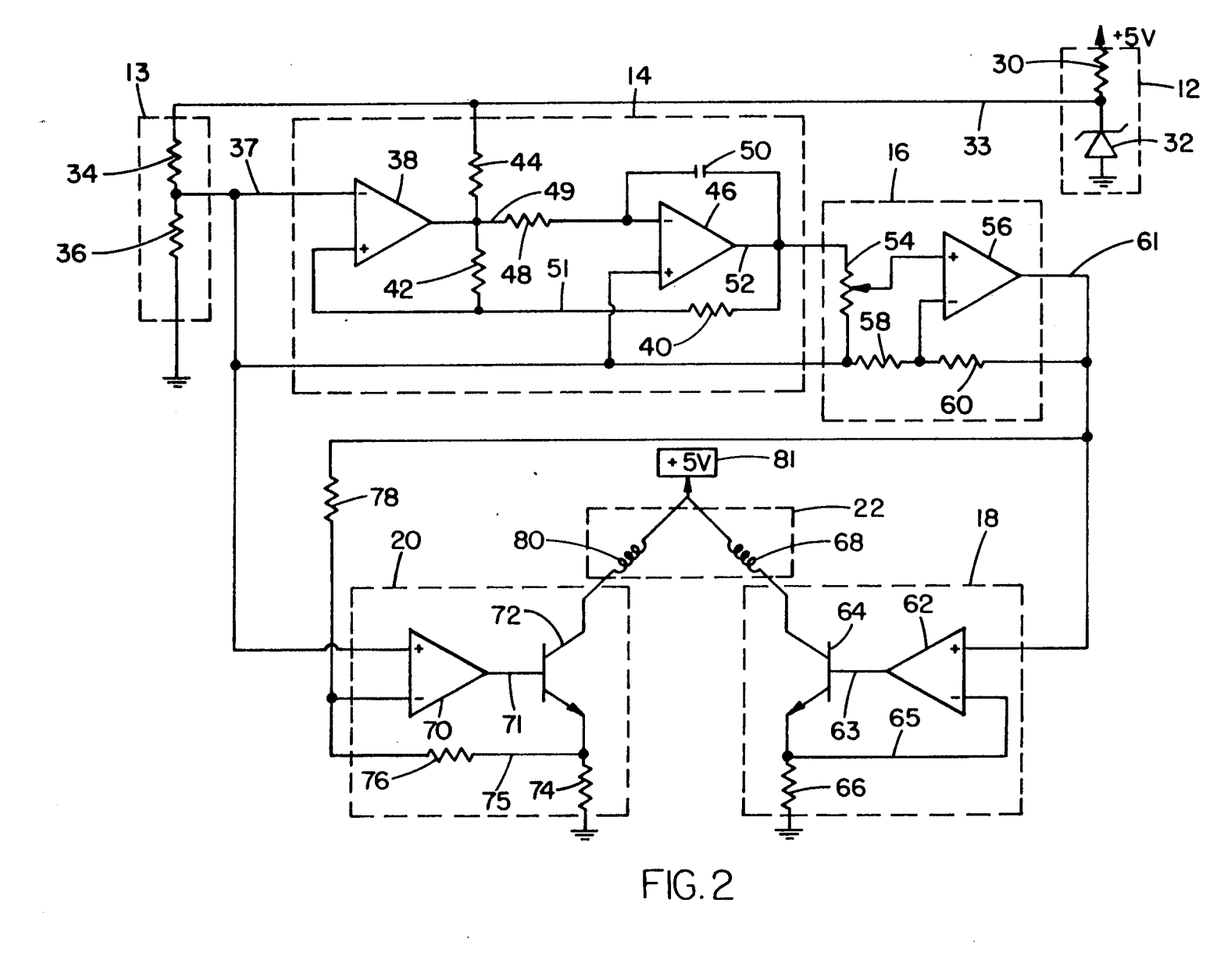
FIG. 2 is an electric circuit schematic of the motor drive circuit of the present invention.

Referring to FIG. 2, it is shown that the voltage regulator circuit 12 is comprised of a resistor 30 connected to a power supply (not shown), preferably of 5 volts, and a zener diode 32 with a pre-selected breakdown voltage. As stated in the previous paragraph, a voltage regulator circuit must maintain a constant voltage output regardless of the current drawn from the regulator. The zener diode 32 is a device that is able to provide a constant voltage across its terminals provided that the current drawn through it does not cause the diode to breakdown. The manufacturers of zener diodes provide voltage and current ratings for each diode they manufacture; therefore, a circuit designer can choose the necessary diode for the particular application. Signal line 33 carries the constant dc voltage from the voltage regulator circuit 12 to a voltage divider circuit 13 comprised of two resistors 34 and 36. The voltage divider circuit 13 is used to divide the voltage by a known factor and is capable of sinking some of the current that can be drawn through the diode 32 as a means of protecting the zener diode 32. The output of the voltage divider 13 is then used as the input to the signal generator circuit 14 and is carried to the circuit by signal line 37.

Referring to FIG. 1, it is shown that the signal generator circuit 14 supplies a signal to a variable gain attenuator 16. The signal generator circuit 14 generates a periodic, time-varying triangular waveform signal with a predetermined frequency and amplitude. The particular signal generator circuit 14 implemented in the present invention generates a periodic, time-varying triangular waveform signal with an amplitude centered around the voltage output of the voltage divider circuit 13 shown in FIG. 2. The frequency and amplitude of the triangular waveform signal is determined by the values of the various components that comprise the signal generator circuit 14. In other words, once it is determined that a waveform signal of given frequency and amplitude is desired, then the various components are chosen in order to achieve the desired waveform characteristics. The triangular waveform signal generated by the signal generator circuit 14 is a periodic, time-varying voltage waveform signal that will ultimately be used to control the current through the stator windings of the high speed scanning motor 22. The amplitude and frequency of the waveform determines the amplitude and frequency of oscillation of the shaft of the scanning motor 22; therefore, the amplitude and to a certain extent the frequency of the generated triangular waveform must be regulated to achieve the desired laser scanning system operating characteristics.

Referring to FIG. 2, it is shown that the signal generator circuit 14 is comprised of two operational amplifiers 38 and 46, four resistors 40, 42, 44 and 48 and one capacitor 50. Basically, the signal generator 14 is comprised of two distinct circuits cascaded together. Operational amplifier 38, and resistors 40, 42, and 44 comprise a comparator circuit, and operational amplifier 46, capacitor 50 and resistor 48 comprise an integrator circuit. In the present embodiment, operational amplifier 38 is a LM393, and operational amplifier 46 is a LM324 such as those manufactured by National Semiconductor and Motorola.

A comparator circuit compares a given output signal with a reference signal which is called the comparator threshold. If the output signal is greater than the reference signal, the comparator circuit outputs a positive voltage which is a certain level above the input voltage level. If the input signal is less than the reference signal, the comparator circuit outputs a positive voltage below the level of the input voltage level. The high level and low level outputs of the comparator circuit are equidistant from the input voltage level. A comparator circuit can be configured in such a way as to introduce hysteresis into the characteristics of the comparator and thus achieve bistable circuit operation. The concept of hysteresis is a well known concept in circuit design and is commonly introduced into comparator circuits to achieve bistable circuit operation which allows for the generation of square waves of arbitrary frequency and pre-determined amplitude. There are other uses for bistable circuits; however, they are of no concern to the present invention.

A bistable circuit has two stable states and can remain in either state indefinitely. The bistable circuit will only change states when the input voltage is above the lower threshold of the comparator or below the upper threshold of the comparator. This second set of threshold values is determined by the magnitude of hysteresis introduced into the comparator circuit. The hysteresis threshold values are determined as a function of resistor 40 and 42. As can be seen from the above description, by proper selection of the various components of the comparator circuit, a square wave can be generated based on the principle that the bistable comparator circuit can output voltages at two distinct levels. The amplitude of the square wave, which is basically the upper and lower comparator outputs, is determined by the operational amplifier saturation voltages and resistors 40 and 42 and therefore must be chosen accordingly. The frequency of the square wave can also be adjusted to some extent by varying the resistance of resistor 44.

In the design and analysis of circuits using operational amplifiers, there are three parameters or characteristics of the operational amplifier itself that must be considered. The operational amplifier is considered to have infinite input impedance at both input ports, it has an infinite gain, and it has zero output impedance. These three parameters or characteristics of the operational amplifier indicate that an operational amplifier has zero potential difference between its inputs and that the input voltage of the operational amplifier is independent of the current drawn from the output. The basic operation of the bistable circuit mentioned in the above paragraph requires that there be a potential difference between the input terminals of the operational amplifier in order to function as a bistable circuit. One skilled in the art would recognize that the operational amplifier 38 is receiving a feedback signal into the non-inverting terminal of the operational amplifier and this feedback signal results in an unstable situation, which allows the output of operational amplifier 38 to be driven to its positive and negative saturation values and provides the necessary potential difference between the inputs. The operation of a bistable circuit is well known in the art and reference to its design and implementation can be found in any electrical engineering text book or hand book such as Aram Budak, *Passive and Active Network Analysis and Synthesis* (Boston: Houghton Mifflin Company, 1974), pp. 265–269.

The output of the comparator circuit is brought into an integrator circuit via signal line 49. The integrator circuit electronically converts the square wave output of the comparator circuit into a triangular waveform signal. If the output of the comparator circuit is at upper voltage level, $L_+$, a current equal to the voltage $L_+$ divided by the value of resistance of resistor 48 will flow into capacitor 50 causing the output of the integrator circuit to linearly decrease with a slope given by $$S = -L_+/RC, \quad (1)$$

where R is the resistance of resistor 48 and C is the capacitance of capacitor 50. This will continue until the output of the integrator circuit, which is tied back to the comparator input via signal line 51, reaches the lower threshold of the comparator circuit at which point the comparator circuit will switch states, and its output becomes the lower voltage level, $L_-$. At this moment the current through resistor 48 and into capacitor 50 shall reverse direction and become equal to the absolute value of the voltage of $L_-$ divided by the value of resistance of resistor 48. Therefore the integrator circuit output will start to increase linearly with a positive slope given by $$S = |L_-|/RC, \quad (2)$$

where R an C are the same as in equation (1) given above.

The concept of waveform signal generation using bistable comparator circuits with integrators is well known in the art and there are numerous references indicating the particulars of this type of circuit design such as Adel S. Sedra and Kenneth C. Smith, *Micro-Electronic Circuits* (New York: Holt, Rinehart and Winston, 1982), pp. 193–194.

As is shown in FIG. 1, the output of the signal generator 14 is supplied to a variable gain attenuator. The variable gain attenuator 16 is a circuit that is used to adjust the amplitude of the waveform generated by the signal generator circuit 14. The variable gain attenuator provides more flexibility in controlling the amplitude of the generated waveform signal As stated previously, the amplitude of oscillation of the scanning motor shaft is proportional to the amplitude of the current in the stator windings and thus is proportional to the waveform; therefore, the variable gain attenuator 16 allows a circuit designer to have more amplitude regulation control than if the amplitude of the waveform can only be set through the signal generator circuit 12. Basically, the variable gain attenuator 16 is used to fine tune the amplitude of motor shaft oscillation to a desired level for use in the laser scanning system.

Referring to FIG. 2, it is shown that the variable gain attenuator 16 is comprised of a potentiometer or variable resistor 54, operational amplifier 56 and resistors 58 and 60, and is connected to the output of the signal generator 14 via signal line 52. In this embodiment, operational amplifier 56 is a LM324. Basically, the variable gain attenuator circuit 16 is a simple operational amplifier circuit whose attenuation gain varies with the resistance value of the potentiometer 54. When the potentiometer 54 is set at a high resistance, the amplitude of the waveform is large, as the value of the resistance decreases, the amplitude of the waveform decreases proportionally The use of this type of circuit is well known in the art.

Referring again to FIG. 1, it is shown that the output of the variable gain attenuator 16 is supplied to a non-inverting voltage-to-current converter 18 and an inverting voltage-to-current converter 20. The non-inverting voltage to current converter 18 converts the periodic, time-varying triangular voltage waveform signal to a periodic, time-varying triangular current waveform while the inverting voltage-to-current converter 20 does exactly the same thing, however, it also switches the polarity of the waveform. Basically, this means that the two converted waveforms are 180 degrees out of phase; while one waveform has a rising slope, the other has a falling slope.

Figure 3:
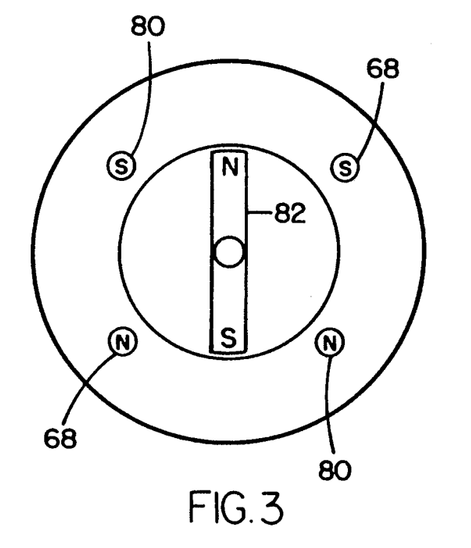
FIG. 3 is a diagrammatic view of the motor with the rotor in its equilibrium position.
Figure 4:
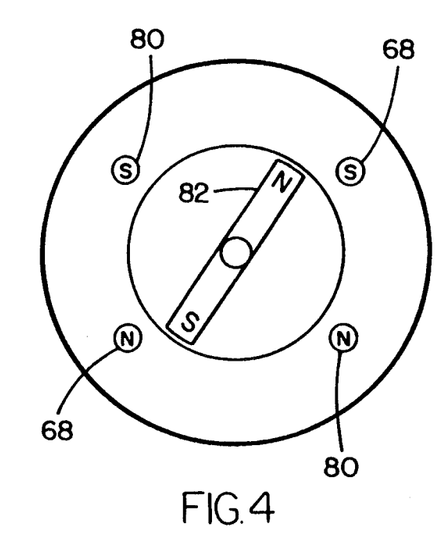
FIG. 4 is a diagrammatic view of the motor with the rotor at its limited sweep in the clockwise direction.
Figure 5:
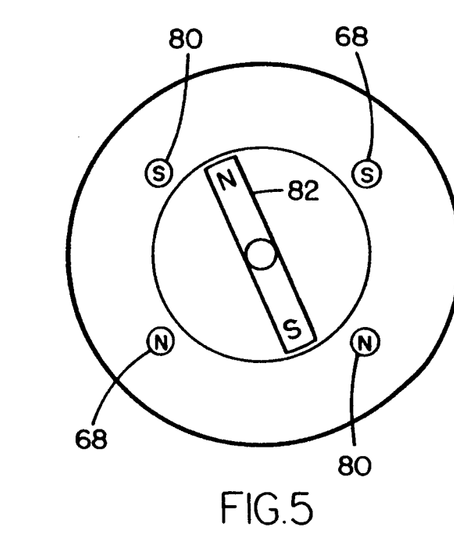
FIG. 5 is a diagrammatic view of the motor with the rotor at its limited sweep in the counter-clockwise direction.
Figure 6:
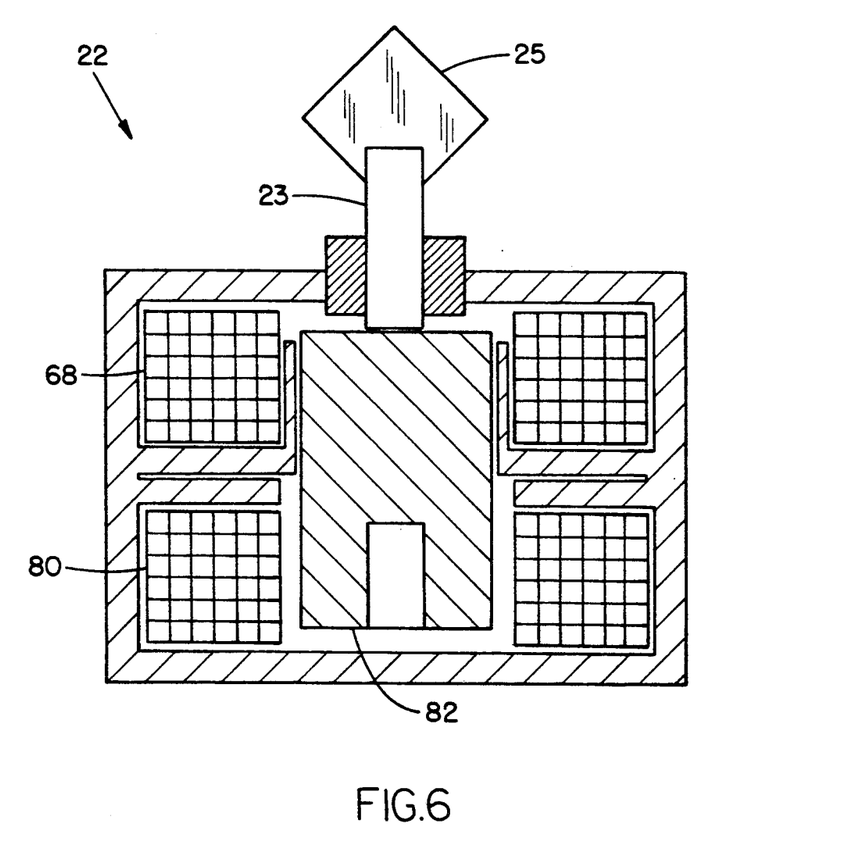
FIG. 6 is a cross-sectional view of the high speed scanning motor of the present invention.

In order to better understand the principle involved, FIGS. 3, 4 and 5 show the position of the rotor 82 when the stator windings 68 and 80 are being energized and de-energized. Basically, when one of the stator windings is receiving an increasing amount of current, as indicated by a positive slope of the triangular waveform, that particular winding develops a magnetic force field of increasing strength, while the second set of stator windings has a decreasing amount of current thereby reducing the strength of its magnetic force field. FIG. 3 shows the rotor 82 in a neutral position when both sets of stator windings 68 and 80 are of equal magnetic force field strength. This phenomenon occurs twice, once when the motor is off and once when each triangular waveform, one rising and one falling, has an equal voltage or current magnitude. If the output of the non-inverting voltage-to-current converter circuit 18 is rising, as indicated by a positive slope of the current waveform signal, and the output of the inverting voltage-to-current circuit 20 is falling, as indicated by a negative slope designating a 180 degree phase shift from the rising waveform, then the rotor 82 will tend to align itself with stator poles 68, as shown in FIG. 4, which have a stronger magnetic force field due to an increased current flow. FIG. 5 illustrates the condition existing when stator poles 80 have a stronger magnetic force field, in which the rotor 82 tends to move towards this set of poles. The phase relationship between the two triangular waveforms allows for a smooth motor shaft oscillation as the permanent magnet rotor 82 aligns itself with the electrically generated magnetic poles of the stator windings 68 and 80. Since both periodic, time-varying current waveforms are of equal amplitude, when one signal is at its lowest point the other waveform is at its highest point, thereby maximizing the magnetic force field, and allowing the shaft of the motor to reach its maximum rotation. It is important to note that both pairs of stator windings 68 and 80 are wound in the same direction, thus always producing the magnetic poles of each set of windings with north and south situated in the same direction. FIG. 6 shows a cross-section of the actual high speed scanning motor 22 with the output shaft 23 and light reflecting means 25 attached to rotor 82, and the rotor 82 is surrounded by the two set of stator windings 68 and 80.

As the stator coils are alternately energized and de-energized they heat up and as a result of this heating effect, the resistance of the stator coils change. If a periodic voltage were used to energize the stator coils, and as the coils heated up, the current drawn through the coils would vary, thus producing variations in the magnetization of the coils. The triangular voltage waveform signal is converted into a triangular current waveform to avoid the problems of a non-controllable variation in the magnetization of the stator coils by supplying a controllable current signal.

Referring back to FIG. 2, it is shown that the non-inverting voltage-to-current converter circuit 18 is comprised of an operational amplifier 62 connected to the base terminal of a bipolar junction transistor (BJT) 64 via signal line 63. The emitter terminal of the BJT 64 is connected to resistor 66 which is connected to ground. Signal line 65 taps off the emitter-resistor connection and feeds back to the inverting terminal of operational amplifier 62. The collector terminal of the BJT 64 is connected to stator windings 68 of motor 22. Operational amplifier 62 receives the periodic voltage triangular waveforms from the variable gain attenuator 16 via signal line 61. In this embodiment, operational amplifier 62 is a LM324. A virtual short circuit appears between the two input terminals of operational amplifier 62, which as stated before is the normal operating condition for operational amplifier circuits, which in turn causes an almost perfect replica of the input signal voltage to appear across resistor 66; thus the current through resistor 66 will be directly proportional to the incoming voltage signal. The input resistance to operational amplifier 62 is considered infinite and thus no current flows into the input terminals of the operational amplifier 62; therefore, the current flowing through resistor 66 to ground is forced to be supplied from the power supply 81 through stator coils 68 through the BJT 64. The current flow through all terminals of the BJT 64 is given by $$i_C = i_E - i_B \qquad (3)$$

where $i_C$ is the current in the collector terminal of BJT 64, $i_E$ is the current in the emitter terminal of BJT 64, and $i_B$ is the current in the base terminal of BJT 64. Typically, the base current, $i_B$, is one hundred times smaller than the collector current $i_C$; therefore, for practical purposes, the collector current, $i_C$, can be considered equal to the emitter current $i_E$. The above equation is for a BJT that is in the active mode of operation which means that the BJT must be biased in such a way as to ensure that the collector terminal is at a higher potential then the base terminal and that the base terminal must be at a higher potential then the emitter terminal. When a BJT is in the active mode current flows through it as dictated by the above equation. The potential of the power supply 81, the potential at the output of operational amplifier 62 and the potential at the emitter junction of BJT 64 ensure that BJT 64 is in the active mode Since the current drawn from the power supply 81 through stator coil 68 must equal the current through resistor 66, it shall vary as the current through resistor 66 varies which varies because the voltage across resistor 66 varies. The current drawn from power supply 81 through stator coil 68 varies with an amplitude and frequency comensurate with that of the supplied triangular waveform, and thus stator windings 68 will have a magnetic force field with a strength proportional to amplitude of the current flowing through the windings. The current drawn through stator windings 68 is supplied from a power supply 81 which typically is a 5 volt supply. The periodic, time-varying current waveform flowing through the stator coils sets up the periodic, time-varying magnetic field previously described with respect to FIGS. 3–5.

The inverting voltage-to-current converter circuit 20 is comprised of an operational amplifier 70 connected to the base terminal of a BJT 72 via signal line 71. The emitter terminal of the BJT 72 is connected to resistor 74 which is connected to ground. Signal line 75 taps off the emitter-resistor connection and feeds back to the inverting terminal of operational amplifier 70 through resistor 76. In this embodiment, operational amplifier 70 is a LM324. Resistors 76 and 78 are required in the circuit to achieve a consistent gain in the circuit The collector terminal of the BJT 72 is connected to stator winding 80 of motor 22. Operational amplifier 70 receives the periodic voltage triangular waveform from the variable gain attenuator 16 via signal line 61. A virtual short circuit appears between the two input terminals of operational amplifier 70 which in turn causes an almost perfect replica of the input signal voltage to appear across resistor 74 thus the current through resistor 74 will be directly proportional to the incoming voltage signal. The only difference between converter 18 and converter 20 is that the input waveform is entering converter 20 through its inverting terminal thus causing the phase reversal and the need for resistors 76 and 78 to achieve consistent gain between the two converters 18 and 20. As stated previously, the emitter current in a BJT is equal to the collector current if it is assumed that the base current is negligible; therefore, as described previously, the current drawn through stator windings 80 of scanning motor 22 and through BJT 72 has an amplitude and frequency proportional to the supplied triangular waveform, and thus the stator windings 80 will have a magnetic force field with a strength proportional to the current flowing through it.

The above two paragraphs describe what happens when the particular stator coil 68 or 80 is energized. Obviously, since the current waveforms are 180 degrees out of phase, both coils are not energized or de-energized at the same time; however, they do allow for smooth rotation of the motor shaft. As one stator coil is being supplied more current, the other stator coil is receiving less current and when the first coil is receiving maximum current the second coil is receiving negligible current which is not enough to cause a magnetic force field of any significant strength. Basically, when either operational amplifier 62 or 70 has a low voltage input, minimal current is drawn through both bipolar junction transistors 64 or 72, thus no current is flowing through either motor coil 68 or 80. The theory of voltage-to-current conversion using operational amplifiers is well known in the art.

Figure 7:
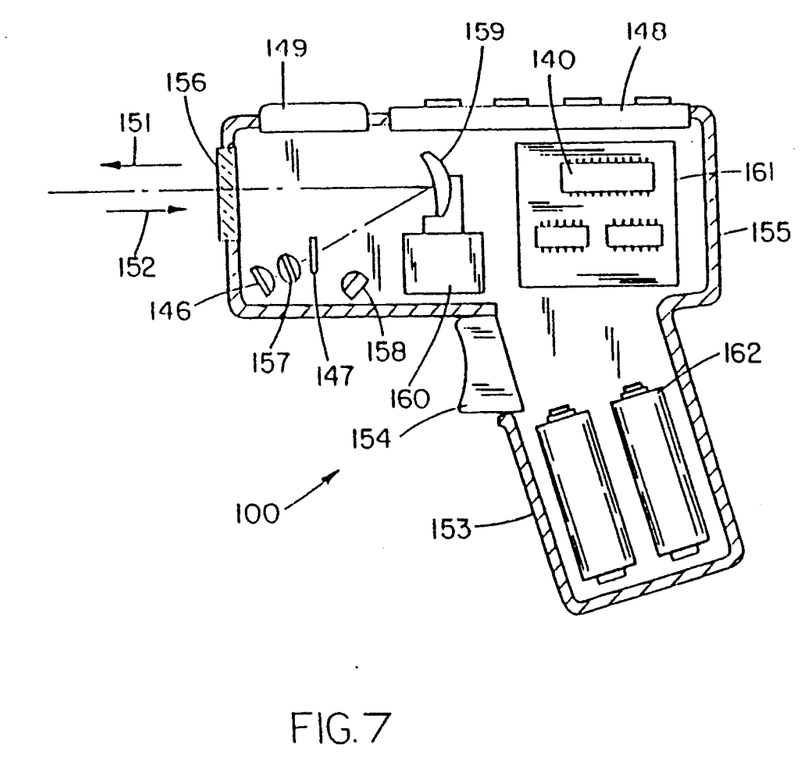
FIG. 7 is a highly simplified cross sectional view of a hand held bar code reader.

The present invention may be implemented in a hand-held, laser-scanning, bar code reader unit such as illustrated in FIG. 7. This hand-held device of FIG. 7 is generally of the style disclosed in U.S. Pat. No. 4,760,248, issued to Swartz et al, assigned to Symbol Technologies, Inc., and also similar to the configuration of a bar code reader commercially available as part number LS 8100 from Symbol Technologies, Inc. Alternatively, or in addition, features of U.S. Pat. No. 4,387,297 issued to Swartz et al, or U.S. Pat. No. 4,409,470 issued to Shepard et al, both such patents assigned to Symbol Technologies, Inc., may be employed in constructing the bar code reader unit of FIG. 7. These U.S. Pat. Nos. 4,760,248, 4,387,297 and 4,409,470 are incorporated herein by reference. A outgoing light beam 151 is generated in the reader 100, usually by a laser diode or the like, and directed to impinge upon a bar code symbol a few inches from the front of the reader unit. The outgoing beam 151 is scanned in a fixed linear pattern, and the user positions the hand-held unit so this scan pattern traverses the symbol to be read. Reflected light 152 from the symbol is detected by a light-responsive device 146 in the reader unit, producing serial electrical signals to be processed for identifying the bar code. The reader unit 100 is a gun shaped device, having a pistol-grip type of handle 153 and movable trigger 154 is employed to allow the user to activate the light beam 151 and detector circuitry when pointed at the symbol to be read, thereby saving battery life if the unit is self-powered. A light-weight plastic housing 155 contains the laser light source, the detector 146, the optics and signal processing circuitry, and the CPU 140 as well as a battery 162. A light-transmissive window 156 in the front end of the housing 155 allows the outgoing light beam 151 to exit and the incoming reflected light 152 to enter. The reader 100 is designed to be aimed at a bar code symbol by the user from a position where the reader 100 is spaced from the symbol, i.e., not touching the symbol or moving across the symbol. Typically, this type of hand-held bar code reader is specified to operate in the range of perhaps several inches.

As seen in FIG. 7, a suitable lens 157 (or multiple lens system) is used to collimate and focus the scanned beam into the bar code symbol at an appropriate reference plane, and this same lens 157 may be used to focus the reflected light 152. A light source 158 such as a semiconductor laser diode is positioned to introduce a light beam into the axis of the lens 157 by a partially-silvered mirror and other lenses or beam-shaping structure as needed, along with an oscillating mirror 159 which is attached to a scanning motor 160 activated when the trigger 154 is pulled. If the light produced by the source 158 is not visible, an aiming light may be included in the optical system, again employing a partially-silvered mirror to introduce the beam into the light path coaxially with the lens 157. The aiming light, if needed, produces a visible-light spot which is scanned just like the laser beam; the user employs this visible light to aim the reader unit at the symbol before pulling the trigger 154.

Although the present invention has been described with respect to linear or single line bar codes, it is not limited to such embodiments, but may also be applicable to more complex scanning patterns and to stacked or two dimensional bar codes such as Code 49 and similar symbologies. It is conceivable that the method of the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser/optics subassembly mounted on a support, a scanning element such as a rotating or reciprocating mirror, and a photodetector component. Control or data lines associated with such components may be connected to an electrical connector mounted on the edge or external surface of the module to enable the module to be electrically connected to a mating connector associated with other elements of data acquisition system.

An individual module may have specific scanning or decoding characteristics associated with it, e.g. operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as keyboard, display, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

I will be understood that each of the features described above, or two or more together, may find a useful application in other types of scanners and bar code readers differing from the types described above.

While the invention has been illustrated and described as embodied in it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic of specific aspects of this invention and, therefore, such adaptions should and are intended to be comprehended within the meaning and range of equivalence of the following claims.

What is claimed is:

1. A scanning device for repetitively scanning a target, said device having a laser beam generating means, at least one high speed scanning motor having a reflection means mounted on a drive shaft of said high speed scanning motor for directing the laser beam provided by said laser beam generating means, and a motor drive circuit being an open-loop control system for adjusting the amplitude of oscillation of the scanning motor to a predetermined level and presetting the frequency of oscillation of the scanning motor to a predetermined level comprising a waveform generation means to supply a first and second periodic, time varying triangular waveform to a pair of stator windings in the scanning motor, said first and second periodic, time-varying triangular waveforms being of equal magnitude and 180 degrees out of phase with respect to one another so as to cause increasing and decreasing current flow in alternate stator windings of said pair of stator windings and corresponding increasing and decreasing magnetization in said alternate stator windings, said increasing and decreasing magnetization in alternate stator windings providing smooth reflection means rotation and to maximize said reflection means rotation.

2. The scanning device of claim 1, wherein said open-loop control system controls said scanning motor by supplying said first and second periodic, time-varying triangular waveforms to said pair of stator windings causing said pair of stator windings to develop periodic, time-varying magnetic fields.

3. The scanning device of claim 2, wherein said first and second periodic, time-varying triangular waveforms are of equal predetermined amplitude and frequency, but are of opposite polarity.

4. A miniature, hand-held scanning device for repetitively scanning a target with laser light, said device having a laser beam generating means, at least one high speed scanning motor, said motor having first and second stator windings, a permanent magnet rotor, a shaft connected to said rotor having light reflecting means attached thereto and being operable to oscillate in alternate circumferential directions, and a motor drive circuit for adjusting the amplitude of oscillation and presetting the frequency of oscillation of said scanning motor, said motor drive circuit being an open-loop control system comprising:

a voltage regulator means for generating a constant dc voltage, said constant dc voltage provides an input signal to a signal generator means which generates a periodic, time-varying voltage waveform of preselected amplitude and frequency;

a variable gain attenuator means for scaling the output of said periodic, time-varying voltage waveform; and a voltage-to-current converting means for converting said periodic voltage waveform into a first and second periodic time-varying, triangular current waveform, said first and second waveforms are input into said first and second stator windings of said scanning motor.

5. The scanning device of claim 4, wherein said voltage regulator means comprises a zener diode of preselected breakdown voltage connected through a resistor of predetermined resistance to a dc voltage source.

6. The scanning device of claim 4, wherein said signal generator means comprises:

a bistable comparator circuit for generating a periodic, time-varying voltage-based square wave of predetermined frequency and amplitude; and an integrator circuit for integrating said periodic, time varying voltage-based square wave and producing a periodic, time-varying voltage-based triangular wave.

7. The scanning device of claim 4, wherein said variable gain attenuator means comprises a variable gain operational amplifier circuit.

8. The scanning device of claim 7, wherein said variable gain attenuator means further comprises a potentiometer for adjusting the gain of said operational amplifier circuit.

9. The scanning device of claim 4, wherein said voltage-to-current converting means comprises:

a non-inverting voltage-to-current converting means, said non-inverting voltage-to-current converting means receiving the output signal of said variable gain attenuator means; and an inverting voltage-to-current converting means said inverting voltage-to-current converting means receiving the output signal of said variable gain attenuator means.

10. The scanning device of claim 9, wherein said non-inverting voltage-to-current converting means comprises:

an operational amplifier configured as a voltage-to-current converter receiving output from said variable gain attenuator means through a non-inverting input terminal of said operational amplifier; and a bipolar junction transistor in which the base of said bipolar junction transistor is connected to the output terminal of said operational amplifier, the collector of said bipolar junction transistor is connected to said first stator windings, and the emitter of said bipolar junction transistor is connected to the inverting input terminal of said operational amplifier and through a resistor of predetermined resistance to ground, said bipolar junction transistor operating as a current switch.

11. The scanning device of claim 9, wherein said inverting voltage-to-current converting means comprises:

an operational amplifier configured as a voltage-to-current converter receiving output from said variable gain attenuator means through an inverting input terminal of said operational amplifier; and a bipolar junction transistor in which the base of said bipolar junction transistor is connected to the output terminal of said operational amplifier, the collector of said bipolar junction transistor is connected to said second stator windings, and the emitter of said bipolar junction transistor is connected to the inverting terminal of said operational amplifier through a first resistor of predetermined resistance and to ground through a second resistor of predetermined resistance, said bipolar junction transistor operating as a current switch.

12. A method for repetitively scanning a target with light by adjusting the amplitude of oscillation and presetting the frequency of oscillation of a scanning motor, having light reflecting means mounted on a shaft thereof to a predetermine level, comprising supplying a first and second periodic, time-varying triangular waveforms to a pair of stator windings in the scanning motor, said first and second periodic, time-varying triangular waveforms being of equal magnitude and 180 degrees out of phase with respect one another so as to cause increasing and decreasing current flow in alternate stator windings of said pair of stator windings and corresponding increasing and decreasing magnetization in said alternate stator windings, said increasing and decreasing magnetization in alternate stator windings providing smooth light reflecting means rotation and to maximize said light reflecting means rotation.

13. The method of claim 12, wherein adjusting step includes generating said first and second periodic, time-varying triangular waveforms having equal predetermined amplitude and frequency, but opposite polarity, and supplying them to said pair of stator windings thus causing said pair of stator windings to develop periodic, time-varying magnetic fields.

14. A method for repetitively scanning a target with light by adjusting the amplitude and presetting the frequency of oscillation of a scanning motor, said motor having first and second stator windings, a permanent magnet rotor, and a shaft connected to the rotor having light reflective means mounted thereon and being operative to oscillate in alternate circumferential directions, said method comprising:

generating a constant dc voltage to provide an input signal to a signal generating means;

generating a periodic time-varying voltage waveform;

scaling the periodic, time-varying voltage waveform in order to adjust its amplitude;

converting said periodic, time-varying voltage waveform into a pair of periodic, time-varying current waveforms which are of equal magnitude, and 180 degrees out of phase with respect to one another; and supplying the pair of periodic, time-varying current waveforms to said first and second stator windings of said scanning motor so as to cause increasing and decreasing current flow in alternate stator windings of said pair of stator windings and corresponding increasing and decreasing magnetization in said alternate stator windings, said increasing and decreasing magnetization in alternate stator windings provides for smooth light reflective means rotation and to maximize said light reflective means rotation.

15. The method of claim 14, wherein the converting step further includes reversing the polarity of one of said periodic, time-varying current waveforms and supplying both waveforms to said first and second stator windings of said scanning motor to alternately energize and de-energize said stator windings, thus producing periodic, time-varying magnetic fields in said stator windings.

16. The method of claim 14, wherein the step of generating a periodic, time-varying voltage waveform comprises:

generating a periodic, time-varying square wave of predetermined amplitude and frequency; and converting said square wave into a periodic, time-varying triangular waveform of predetermined amplitude and frequency.

* * * * *